Nov. 24, 1931. C. A. MESSMER, JR Re. 18,260

DIE

Original Filed Oct. 26, 1927 2 Sheets-Sheet 1

INVENTOR.
Charles A. Messmer Jr.
BY
Allen Allen
ATTORNEYS

Nov. 24, 1931. C. A. MESSMER, JR Re. 18,260

DIE

Original Filed Oct. 26, 1927 2 Sheets-Sheet 2

INVENTOR.

BY Charles A. Messmer Jr.

Allen Allen

ATTORNEYS

Reissued Nov. 24, 1931

Re. 18,260

UNITED STATES PATENT OFFICE

CHARLES A. MESSMER, JR., OF ST. LOUIS, MISSOURI, ASSIGNOR TO BENJAMIN W. FREEMAN, OF CINCINNATI, OHIO

DIE

Original No. 1,718,476, dated June 25, 1929, Serial No. 228,748, filed October 26, 1927. Application for reissue filed October 13, 1930. Serial No. 488,478.

This invention relates to dies for cutting or dieing out blanks from sheet material such as leather, fiber-board, cloth, or the like, and pertains more particularly to dies of the type used with a cut-out press for cutting out ornamental perforations and the like in the fitted uppers of shoes, slippers, and the like.

The cut-out presses used for this purpose usually comprise a vertically reciprocating head or hammer that descends on the die and a slide table having guide grooves thereon that co-operate with a block that depends from the underside of the front portion of the die and is slidable on the table so that the die may be shifted from under the head towards the operator to facilitate the insertion in or removal from the die of the work or blank that is to be operated on, and may again be shifted back under the head preparatory to operating the press. The rear portion of the die when under the head is supported by a stationary post on the table, and the said rear portion is unsupported when the die is pulled toward the operator into loading or unloading position, thereby affording clearance for the passage over the rear end of the die of the fitted upper whose one side overlies the die and whose other side underlies the die. Otherwise stated, the rear end of the form of die used prior to this invention overhangs to project into the interior of the fitted upper, and the overhanging rear portion is supported by the stationary post on the slide table only when the die is pushed under the head. Furthermore, a stripper plate that serves, also, as a locating plate is hinged to the rear top face of the die and this plate must be lifted each time an upper is inserted or removed, since, to insert the upper, it must be passed in embracing relation over the plate prior to passing it over the rear end of the die, and to remove it this procedure must be reversed. Manifestly, the aforesaid awkward and indirect manner of reloading the die requires considerable time and impedes production.

Accordingly, it is an object of the present invention to provide a die for the purpose set forth that is so arranged that the uppers may be inserted therein or removed therefrom by a shorter, more direct, and more convenient path than that through which the uppers are applied to the aforesaid old form of die, thereby simplifying the operation and expediting production.

The perforations are often designed to be non-symmetrical, so that right and left dies must be used respectively for the reversely shaped perforations of the opposite sides of the shoe in order to bring the inside of the upper against the face of the die.

Accordingly, another object of the invention is to provide a single die of the character described that is adapted for cutting the reversely shaped perforations of both sides of the fitted upper, thereby avoiding the expense of two separate dies, as has heretofore been necessary for this purpose.

The aforesaid hinged stripper or locating plate is formed of sheet steel and is slightly flexible, and, on account of the horizontal pivotal axis of the hinges not being vertically shiftable, the plate is bent or slightly distorted when the head of the press descends on it in order to maintain the plate parallel to the face of the die, the distortion including a slight forward or backward displacement of the plate that brings the apertures in the plate out of their correct relation to the cutting edges of the die block.

It is accordingly a further object of the invention to provide a form of hinge for the aforesaid plate which shall yield vertically to maintain the plate parallel to the face of the die when the head of the press descends thereon and thereby prevent any accompanying longitudinal displacement of the plate with relation to the die.

Other objects or advantages, more or less ancillary to the foregoing will appear in the course of the following description of a preferred embodiment of the invention that has been selected for the purpose of illustration only and not in a limiting sense.

In the accompanying drawings, forming part of this specification, in which like numbers of reference denote like parts wherever they occur, Figure 1 is a perspective view of the die of this invention.

Figure 1:
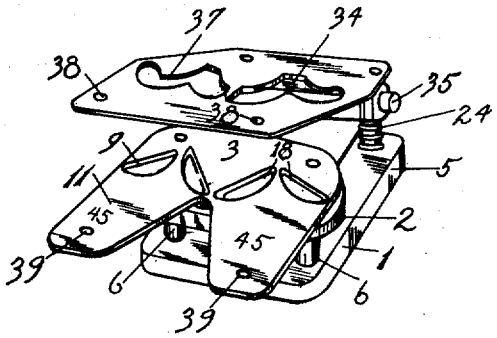

The die comprises a base 1, a die block 2, a stripper 3, and a locating device 4 to facilitate the positioning of the stock on the die, and over the stripper. The base 1 is a substantially rectangular slab of metal bifurcated or recessed at its rear end to form a pair of arms 5 that straddle a portion of the cut-out press therebetween. The die block 2 is supported on and spaced from the base 1 by columns 6, preferably of sleeve formation to accommodate therethrough the screws 7 that draw the base 1 and block 2 against the ends of the spacers 6. The die block 2 presents elevated portions 8 on its upper face that operate on the stock. In the illustrated embodiment the portions 8 terminate upwardly in cutting edges 9 that are adapted to form ornamental perforations in the stock, the scrap passing down through the openings 10 that extend through the block and are defined by the cutting edges 9.

The stripper 3 preferably comprises a thin plate or metal sheet 11, having riveted or otherwise suitably attached thereto the depending studs 12, that fit slidably in openings 13 in the block 2. The openings 13 enlarge at their upper ends to form sockets 14 for receiving the expansible springs 15 that are coiled loosely around the studs 12 and bear against the underside of the stripper plate 11. The lower ends of studs 12 are internally screw-threaded to receive screws 16 whose heads 17 are adapted to abut against the under side of the block 2 and thereby limit the ascent of the plate 3 under the impulsion of the springs 15. Plate 11 is provided with openings 18 therethrough to accommodate the portions 8 when the plate descends.

The rear ends of the arms 5 are provided with screw-threaded openings therethrough to receive the externally screw-threaded lower ends 19 of sleeves 20, that are provided with intermediate annular flanges 21 that present shoulders 22 and 23 that are adapted to react respectively against the upper face of the base 1 and the lower ends of the expansible springs 24, loosely coiled around the sleeves 20. The lower end of each of the sleeves 20 is larger in internal diameter than the upper end of the sleeves in order to leave a shoulder 25, that is adapted to be engaged by the head 26 of a screw 27, screwed into a tapped hole in the lower end of a stud 28, that fits slidably in the upper end of the sleeve 20. The upper end of each stud 28 enlarges to form a shoulder 29 against which the upper end of the spring 24 may be seated, thereby urging stud 28 upwardly until head 26 of screw 27 abuts against shoulder 25. The upper ends of the studs 28 are bifurcated to receive between prongs 30 the tongues 31 of the studs 32, whose upper ends 33 are riveted or otherwise suitably secured to the locating plate 4. Tongues 31 and prongs 30 are pivotally connected by a pin 34, that passes through the prongs and tongues of each pair of studs 28 and 32. Pin 34 is preferably held against longitudinal displacement by means of nuts or knobs 35, that fit the externally screw-threaded ends 36 of the pin 34. Plate 4 contains openings 37 that conform in outline to stitches or other identifying characters on the fitted upper, and that serve thereby to locate the fitted upper correctly with relation to the edges 9 of the die. Plate 4, also, contains openings 38 that are adapted to register with similar openings 39 in plate 11 when the plates are correctly positioned with relation to one another.

An inverted U-shaped strap 40 has its extremities 41 attached to the rear ends of the straddling portions 5 of the base 1 by means of screws 42, the intermediate portion 43 of said strap being adapted to pass over the aforesaid stationary post of the press and to trip a safety device thereon.

Figure 2:
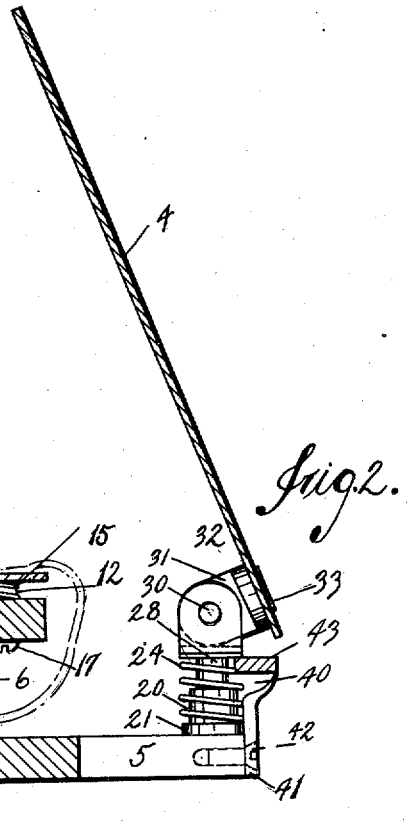
Figure 2 is a vertical front-to-rear central sectional view, showing the die in open position.
Figure 3:
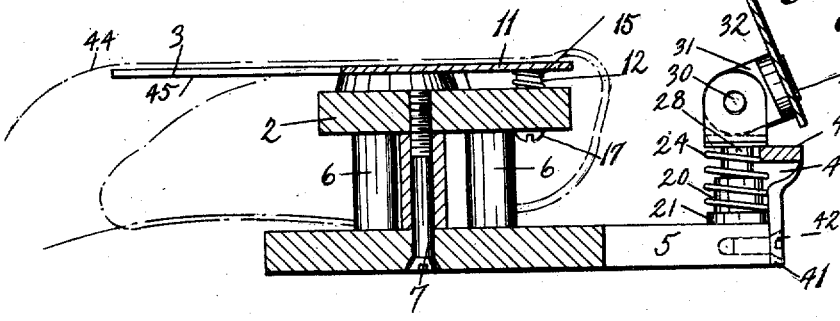
Figure 3 is a fragmentary sectional view taken on the line 3—3 in Figure 5.
Figure 3:
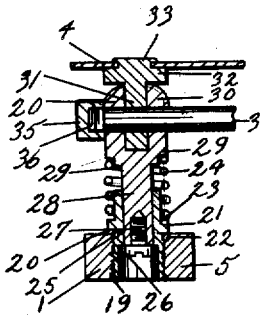
Figure 4:
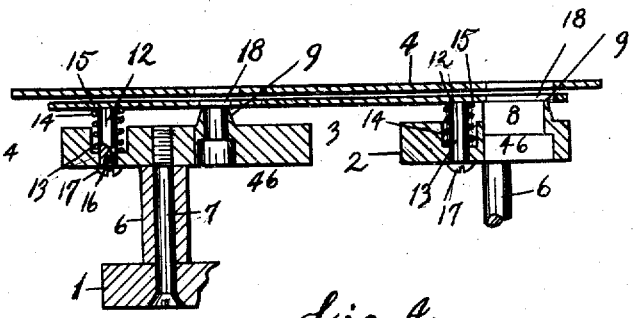
Figure 4 is a fragmentary sectional view taken on the irregular line 4—4 in Figure 5.
Figure 5:
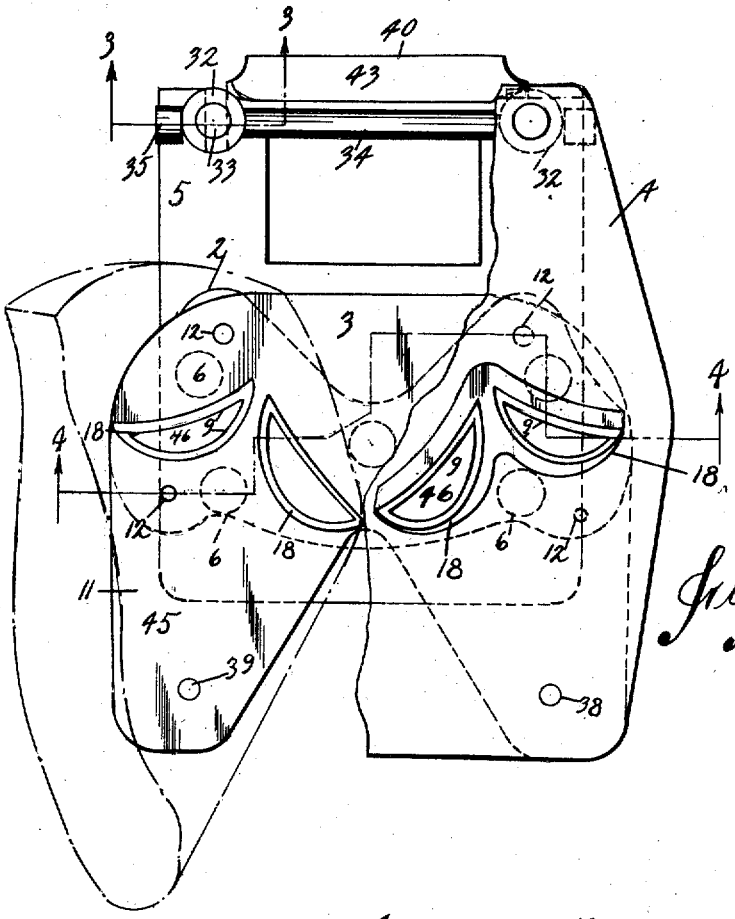
Figure 5 is a plan view of the die as it appears when closed, a part of the upper plate being broken away.
Figure 6:
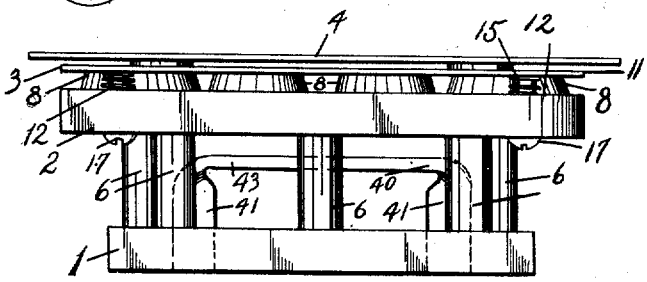
Figure 6 is a front elevation of the same.

The construction of the die having been fully described, the manner of using it will be readily understood. The base 1 of the die fits slidably in the groove of the table or bed of the press so that it may be withdrawn from under the head of the press to a position in front of the operator. Assuming the die to be in front of the operator preparatory to placing a blank or fitted upper thereon, the operator lifts plate 4 to the position shown in Figure 2, and places the fitted sleeve upper 44 around one of the interiorly projecting tongues 45 of the stripper plate 11. It will be observed that the space 46 between the tongues 45 allows the operator to place his fingers on that portion of the underside of the plate 4 that immediately overlies the said space, thereby facilitating the lifting of the plate 4. When the upper has been so placed, the plate 4 is lowered, and the upper or blank 44 is shifted until the appropriate locating characters thereon, such, for instance, as a line of stitching or the edge of an overlaid portion follow the outline of the openings 18 in the plate 11. The operator then presses the plate 4 toward the tongue 39 between his fingers, thereby clamping the upper between the plates 4 and 11, and then pushes the die under the head, whereupon the head descends on the plate 4, pressing the blank or upper against the cutting edges 9 and against the stripper plate 11, which thereupon descends until the upper has been died-out, the scrap descending through the openings in the die that are defined by the edges 9. On the upstroke of the head, the stripper 11 rises under the impulsion of springs 15, and the plate 4 rises under the impulsion of the springs 15 and, also, by reason of the expansible efforts of the springs 24. The die is then withdrawn from its position under the head of the press and the plate 4 is lifted, and the blank or upper removed, and placed on the other side of the die to die out the opposite sides of the shoe, the foregoing cycle of operations being, of course, then repeated.

It will be observed that the block 2 overhangs the spacers 6 so that it can be straddled by the fitted upper, and that the upper can be applied to the die and around an interiorly projected tongue 45 much more quickly and with less manipulation than it can over the stripper plate and then back over the posteriorly projected portion of the dies hitherto in use. Furthermore, the upper can be shifted through a wider range of positions on the present die than on the older forms of die, because the present die offers less obstruction.

It will, also, be observed that the single die illustrated is capable of cutting the reversely shaped perforations of both sides of the upper, thereby avoiding the expense of two separate dies, one side of the shoe upper being held between the plate 4 and one of the tongues 45 and cut by the forming means 8 adjacent to the said tongues, after which the other side of the shoe is held against the other tongue 45 and cut by the reversely shaped forming means 8 adjacent thereto.

Attention is further directed to the fact that the plate 4 can not be distorted and shifted inadvertently forward or backward, such distortion being prevented by reason of the vertical shiftability of the hinges under the pressure of the head of the press, thereby insuring at all times the proper lateral positioning of the locating plate or mask 4 with relation to the die block 2.

The pin 34 insures the alignment of the pivotal axis of each hinge post with that of the other, and the pin may be easily removed to detach plate 4 from the die by unscrewing the nuts 35.

Should the die be accidentally dropped on the floor or otherwise abused, any resulting dislocation of plate 4 with relation to the cutting edges of the die may be detected by reason of the fact that holes 38 in plate 4 would not in that event register with the holes 39 in plate 11.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. In a die unit having a base member, a die block carried thereby, and a work locating member mounted in hinged relation to said base; a support for said member comprising a pair of posts connecting the locating member to the base member, each of said posts comprising a pair of pivotally connected studs, one of which is rigidly attached to one of the members, and the other of which is slidably connected to the other of said members so as to be movable transversely thereto, and resilient means interposed between said last-mentioned elements whereby said members are yieldingly spaced apart.

2. In a die unit having a base member, a die block carried thereby, and a work locating plate for the unit; a support for said plate comprising a pair of posts connecting said base member and plate, each of said posts comprising a pair of studs, one of which is attached to said base member and the other of which is connected to said plate, a single pin passing through the four studs and pivotally connecting together each pair of studs that forms a respective post, and means permitting vertical movement of said plate.

3. In a die unit having a base member, a die block, and a work locating plate for the unit, a support for said plate comprising a pair of posts connecting said base member and plate, each of said posts comprising a pair of studs, each stud of said pair of studs being connected to a respective one of said members, a single pin passing through the four studs and pivotally connecting together each pair of studs that form a respective post, the said pin having enlargements on either end to prevent longitudinal displacement thereof, one, at least, of the said enlargements being detachable to permit the withdrawal of said pin from said studs and means permitting vertical movement of said plate.

4. In a die unit having a base member, a die block carried thereby, and a work locating plate for the unit, a support for said plate comprising studs rising vertically from the rear of said base member, means hingedly connecting said plate to said studs, and resilient means associated with said studs effective to permit vertical movement of said locating plate thereby to maintain the same parallel to the face of said die block.

5. In a die unit having a base member, a die block carried thereby, and a work locating plate for the unit, a support for said plate comprising studs extending from the rear of said base member, studs hingedly connected to said first-named studs, means connecting said plate to said second named studs, and resilient means encircling said first-named studs effective to permit vertical movement of said locating plate thereby to maintain the same parallel to the face of said die block during the operation of said die.

6. In a die unit having a base member, a die block carried thereby, and a work locating plate for the unit, a support for said plate comprising sleeves extending upwardly from the rear of said base member, studs mounted in said sleeves, means connecting said plate to said studs for angular movement relative to said block, and resilient means associated with said studs and cooperating with the same and said sleeves to permit vertical movement of said locating plate to maintain the same parallel to the face of said die block during the operation of said die.

7. A die unit for use in a shoe ornamenting machine comprising in combination, a base, spaced pillars extending from said base carrying a die block having registered openings therein to permit the passage of chips into the space between said pillars; work supporting means, a gauge plate effective to locate work with respect to said supporting means, and resilient means including additional pillars extending from said base, to mount said plate independently of said die block for yielding movement relative to said work supporting means and normal to the plane of said die block.

8. A die unit for use in a shoe ornamenting machine comprising in combination, a base, spaced pillars extending from said base carrying a die block having registered openings therein to permit the passage of chips into the space between said pillars, work supporting means, and a locating plate and means on said base to mount said plate for movement relative to said work supporting means and normal to the plane of said die block, said means including a pivotal connection to said plate whereby the plate may be moved angularly with respect to said die block.

9. A die unit for use in a shoe ornamenting machine comprising in combination, a base, spaced pillars extending from said base carrying a die block having registered openings therein to permit the passage of chips into the space between said pillars, a stripper mounted on said block, a locating plate and means resiliently mounting said plate independently of said die block for movement to and from and in a plane normal to the plane of said die block.

10. A die unit for use in a shoe ornamenting machine comprising in combination, a base, spaced pillars extending from said base carrying a die block having openings therein to permit the passage of chips into the space between said pillars, said pillars being substantially cylindrical in section, a work locating plate, and means mounting said plate independently of said die block, for both pivotal and normal movement relative to said block.

11. A die unit for use in a shoe ornamenting machine of the type in which the die structure is movable into position to be actuated by the downward stroke of a plunger comprising in combination a movable base, spaced pillars extending from said base and being rigidly mounted thereon, a die block carried by said rigid pillars, said die block having openings therein to permit the passage of chips into the space between said rigid pillars, a work locating plate, and means mounting said plate independently of said die block, for both pivotal and normal movement relative to said block.

CHARLES A. MESSMER, Jr.